US009698467B2

(12) United States Patent
Mitchell (10) Patent No.: US 9,698,467 B2
(45) Date of Patent: Jul. 4, 2017

(54) WIRED ETHERNET ADAPTOR FOR PORTABLE ELECTRONIC DEVICES

(71) Applicant: The Boeing Company, Seal Beach, CA (US)

(72) Inventor: James A Mitchell, Navarre, FL (US)

(73) Assignee: THE BOEING COMPANY, Chicago, IL (US)

(*) Notice: Subject to any disclaimer, the term of this patent is extended or adjusted under 35 U.S.C. 154(b) by 880 days.

(21) Appl. No.: 13/959,836

(22) Filed: Aug. 6, 2013

(65) Prior Publication Data

US 2015/0043424 A1 Feb. 12, 2015

(51) Int. Cl.
| | |
|---|---|
| *H04Q 1/24* | (2006.01) |
| *H01Q 1/24* | (2006.01) |
| *H01Q 1/22* | (2006.01) |
| *H04M 1/725* | (2006.01) |
| *H04M 1/04* | (2006.01) |

(52) U.S. Cl.
CPC ........... *H01Q 1/243* (2013.01); *H01Q 1/2275* (2013.01); *H01Q 1/242* (2013.01); *H04M 1/7253* (2013.01); *H04M 1/04* (2013.01)

(58) Field of Classification Search
CPC ........ H01Q 1/24; H01Q 1/243; H01Q 1/3291; H01Q 1/526; H01Q 1/241; H01Q 1/2216; H01Q 1/242; H04M 1/04; H04M 1/7253; H04B 1/3877; G06F 1/20; G06Q 20/20
See application file for complete search history.

(56) References Cited

U.S. PATENT DOCUMENTS

| | | | | |
|---|---|---|---|---|
| 5,493,702 A * | 2/1996 | Crowley | ............... | H01Q 1/241 343/702 |
| 6,473,031 B1 * | 10/2002 | Harris | ................... | G01S 5/0036 342/357.51 |
| 9,136,895 B2 * | 9/2015 | Peiker | ................. | B60R 11/0241 |
| 2003/0128165 A1 * | 7/2003 | LaKomski | ............ | H01Q 1/241 343/702 |
| 2004/0229607 A1 * | 11/2004 | La Chapelle | ........ | B64C 1/1492 455/431 |
| 2005/0234778 A1 * | 10/2005 | Sperduti | ............... | G06Q 20/20 705/22 |
| 2009/0305746 A1 | 12/2009 | Pursche et al. | | |

(Continued)

FOREIGN PATENT DOCUMENTS

EP 1489682 12/2004

OTHER PUBLICATIONS

Great Britain Intellectual Property Office; Combined Search Report and Examination for GB Application No. GB1413487.8 dated Nov. 27, 2014.

*Primary Examiner* — Thanh Le
(74) *Attorney, Agent, or Firm* — Parsons Behle & Latimer (57) ABSTRACT

A cover is provided for a portable electronic device having a device wireless antenna. The cover includes a housing configured to accommodate the portable electronic device, as well as a cover wireless antenna located within the housing. The cover also includes a shield surrounding the cover wireless antenna, and configured to surround the device wireless antenna when the portable electronic device is placed in the cover. In addition, the cover includes wireless access point (WAP) electronics in communication with the cover wireless antenna, as well as a wired Ethernet connector in communication with the WAP electronics.

21 Claims, 6 Drawing Sheets

(56) References Cited

U.S. PATENT DOCUMENTS

2012/0082963 A1\* 4/2012 Pirch .................... H01Q 1/2216
434/118
2016/0282913 A1\* 9/2016 Degner .................... G06F 1/20

\* cited by examiner

WIRED ETHERNET ADAPTOR FOR PORTABLE ELECTRONIC DEVICES

FIELD OF THE DISCLOSURE

The present application relates to covers for portable electronic devices, such as tablet computing devices, media players, or mobile phones.

BACKGROUND

A portable electronic device can take many forms such as, for example, a tablet computing device, media player, or mobile phone. Such devices often have wireless communication mechanisms, in order to provide wireless communication between the portable device and base stations, cell phone towers, desktop computers, etc. Common wireless communication mechanisms include IEEE 802.11a, b, g, and n (commonly known as "WiFi"), Worldwide Interoperability for Microwave Access (WiMAX), and cellular communications mechanisms such as Global System for Mobile Communications (GSM) and Code Division Multiple Access (CDMA).

Many portable electronic devices capable of wireless network communications do not include jacks or ports for wired network communications. Even so, on some occasions, it may be desirable to communicate with such portable electronic devices via a wired connection rather than a wireless network. For example, certain transmissions may require heightened security (e.g., secret or classified military or law enforcement data, sensitive financial data, private healthcare information, confidential technical data, etc.) or increased bandwidth or reliability (e.g., real-time telecommunications data, etc.), for which transmission over a wireless network may not be desirable or appropriate.

SUMMARY

The present application discloses a wired Ethernet adaptor that enables portable electronic devices having wireless antennae to send and receive wired network communications, without transmitting over a wireless network.

In one example, a cover is disclosed for a portable electronic device with a device wireless antenna. The cover comprises a housing configured to accommodate the portable electronic device, a cover wireless antenna located within the housing, and a shield surrounding the cover wireless antenna, and configured to surround the device wireless antenna when the portable electronic device is placed in the cover. The cover further comprises wireless access point (WAP) electronics in communication with the cover wireless antenna, and a wired Ethernet connector in communication with the WAP electronics.

The cover may further comprise a power source coupled to the cover wireless antenna and the WAP electronics. The cover may further comprise a screen cover comprising a substantially transparent or translucent material with an embedded wire mesh. The shield may further comprise an additional portion configured such that, when the portable electronic device is placed in the cover, the shield surrounds the portion of the portable electronic device located in the cover. The shield may comprise a metallic foil or mesh, which may comprise copper or aluminum. The WAP electronics may be configured to attenuate the output signal to the cover wireless antenna to a level of about −50 dBm. The cover wireless antenna may also be configured to be located within about ⅛ inch of the device wireless antenna, when the portable electronic device is placed in the cover. The wired Ethernet connector may comprise an 8P8C jack, RF connector, or optical fiber connector. The cover wireless antenna may be configured to transmit and receive signals in accordance with one or more of the following wireless telecommunications protocols: WiFi, WiMAX, Bluetooth, ZigBee, or RuBee. The cover may further comprise a cover mount coupled to the housing, which may be configured to mount the cover to a structure in an aircraft.

In another example, a system comprises a portable electronic device with a device wireless antenna and a cover with a housing containing the portable electronic device. The cover comprises a cover wireless antenna located within the housing, near the device wireless antenna, and a shield surrounding the cover wireless antenna and the device wireless antenna. The cover further comprises wireless access point (WAP) electronics in communication with the cover wireless antenna, and a wired Ethernet connector in communication with the WAP electronics and configured to transmit and receive telecommunications signals sent between the cover and a telecommunications network.

The portable electronic device may comprise a tablet computer, media player, or mobile phone. The system may further comprise an Ethernet cable coupled to the wired Ethernet connector and configured to carry the telecommunications signals sent between the cover and the telecommunications network. The Ethernet cable may comprise a twisted pair cable, coaxial cable, or optical fiber. The telecommunications network may comprise a local area network or a wide area network.

In another example, a method is disclosed for communicating with a portable electronic device having a device wireless antenna and is located in a cover with a cover housing. The method comprises receiving a first wireless transmission from the device wireless antenna with a cover wireless antenna located within the cover housing, converting the first wireless transmission to a first wired telecommunications signal, and transmitting the first wired telecommunications signal to a telecommunications network via an Ethernet cable coupled to a wired Ethernet connector located within the cover housing.

The may further comprise receiving a second wired telecommunications signal via the Ethernet cable, converting the second wired telecommunications signal to a second wireless transmission; and transmitting the second wireless transmission from the cover wireless antenna to the device wireless antenna. The first wireless transmission may be transmitted in accordance with one of the following wireless telecommunications protocols: WiFi, WiMAX, Bluetooth, ZigBee, or RuBee. The device wireless antenna may be located within about ⅛ inch of the cover wireless antenna.

DETAILED DESCRIPTION

Figure 1A:
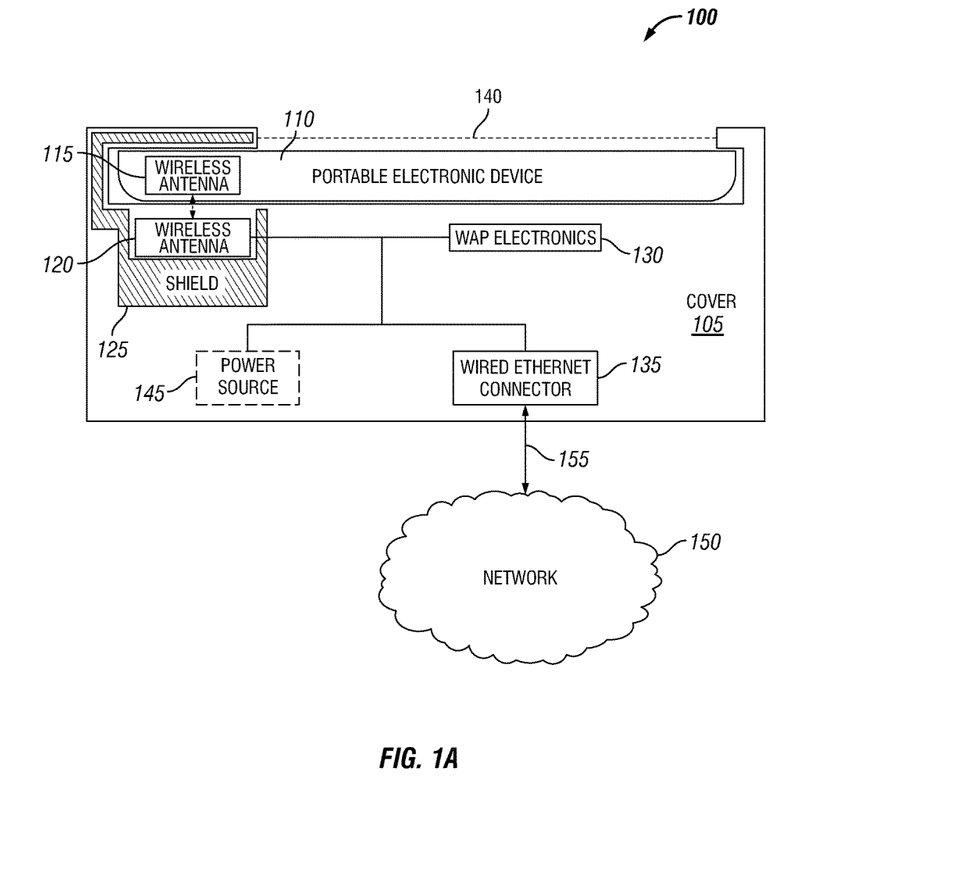
FIGS. 1A and 1B illustrate a block diagram of a cover for a portable electronic device, including a wired Ethernet adaptor.
Figure 1B:
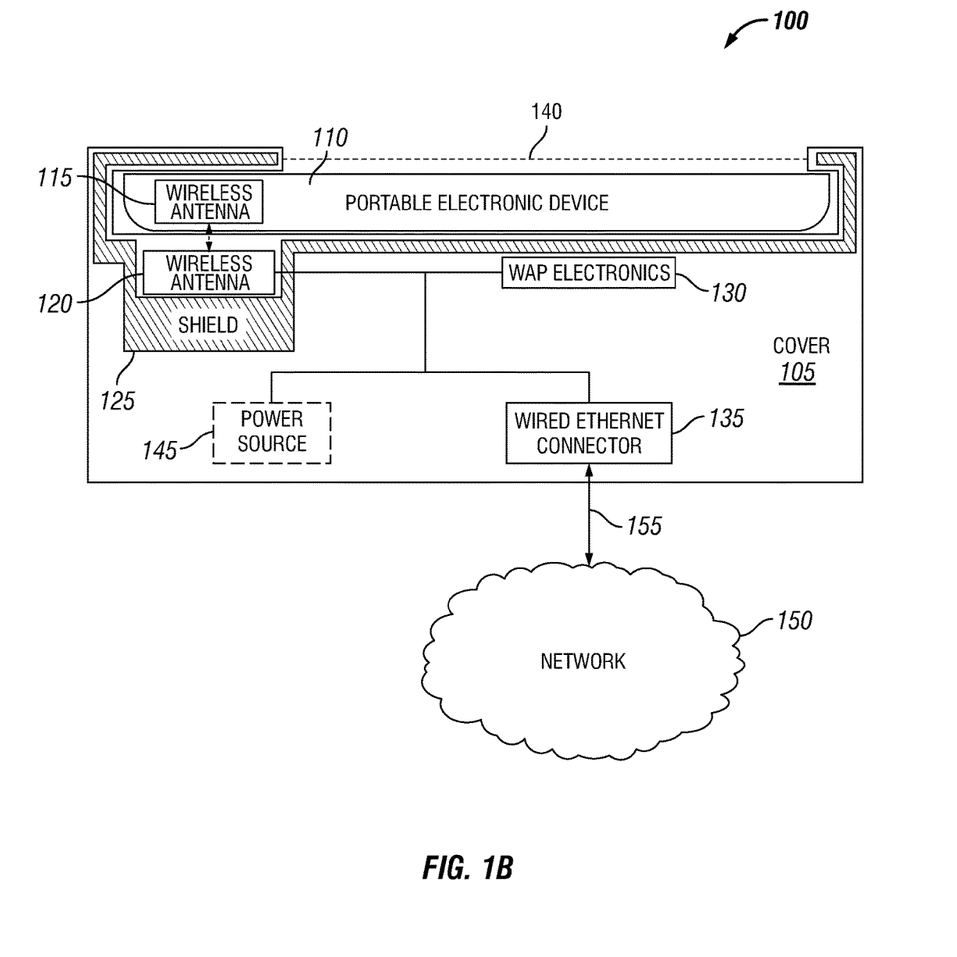

FIGS. 1A and 1B illustrate a block diagram of a system 100 comprising a cover 105 for a portable electronic device 110 having a device wireless antenna 115, such as, for example, a tablet computing device, media player, mobile phone, etc. In many cases, the portable electronic device 110 does not include a jack or a port for wired network communications. The cover 105 has a form factor that can accommodate the portable electronic device 110. In some cases, the cover 105 may be specifically designed for a particular portable electronic device 110, such as a specific model of a tablet computer. In other cases, the cover 105 may have a more generic design intended to accommodate a variety of portable electronic devices 110.

The cover 105 comprises a cover wireless antenna 120 surrounded by a shield 125. In some cases, the cover wireless antenna 120 comprises a unity gain antenna, which is configured to be in close proximity to the device wireless antenna 115 (e.g., within about ⅛ inch), when the device 110 is placed in the cover 105. FIGS. 1A and 1B illustrate two alternative examples of the cover 105 with differing configurations of the shield 125. In the example shown in FIG. 1A, the shield 125 is configured to surround the device wireless antenna 115, when the device 110 is placed in the cover 105. In the example shown in FIG. 1B, the shield 125 includes an additional, optional portion that also surrounds the remainder of the portable electronic device 110 encased within the cover 105. Of course, in other examples, the shield 125 can be sized and configured to surround any desired portion of the portable electronic device 110, which may include portions falling between the two examples shown in the FIGS. 1A and 1B. In some cases, the shield 125 comprises a mesh or foil of a suitable conductive material (e.g., copper, aluminum, etc.) that acts as a Faraday cage or shield to block or significantly attenuate any external wireless transmissions sent to or from the device wireless antenna 115 or the cover wireless antenna 120.

The cover 105 further comprises wireless access point (WAP) electronics 130 in electronic communication with the cover wireless antenna 120. The WAP electronics 130 are preferably configured to attenuate the output signal to and/or from the cover wireless antenna 120 to a level of about −50 dBm. The WAP electronics 130 may comprise various well-known hardware and software modules that enable the cover 105 to send and receive wireless transmissions to and from the portable electronic device 110, using one or more suitable telecommunications protocols, such as, for example, WiFi (IEEE 802.11), WiMAX (IEEE 802.16), Bluetooth (IEEE 802.15.1), ZigBee (IEEE 802.15.4), RuBee (IEEE 1902.1), etc. The cover 105 also comprises a wired Ethernet connector 135 in electronic communication with the WAP electronics 130. The wired Ethernet connector 135 may comprise any suitable connector for interfacing with an Ethernet network, such as, for example, an 8P8C jack (e.g., RJ45 jack, etc.), RF connector (e.g., BNC connector, etc.), optical fiber connector, etc.

In some cases, the cover wireless antenna 120 and WAP electronics 130 may be powered by an optional power source 145 within the cover 105, such as, for example, a battery, capacitor, or AC power adaptor. In other cases, the cover wireless antenna 120 and WAP electronics 130 may be powered via Power over Ethernet (PoE) supplied through the wired Ethernet connector 135, or via another suitable power source. The cover 105 may also comprise an optional screen cover 140 placed over a screen of the portable electronic device 110 when it is placed in the cover 105. In some examples, the screen cover 140 comprises one or more layers of substantially transparent or translucent material with an embedded wire mesh, which acts as a Faraday shield for preventing the portable electronic device 110 from sending or receiving wireless transmissions or even stray radiation. The screen cover 140 is preferably configured to enable a user to view and operate an underlying touchscreen display of the portable electronic device 110, if desired.

The system 100 further comprises a telecommunications network 150, such as a local area network (LAN) or a wide area network (WAN), in communication with the wired Ethernet connector 135 via a suitable cable 155, such as, for example, a twisted pair cable (e.g., Cat 5, Cat 6, etc.), coaxial cable, optical fiber, etc. In operation, when the portable electronic device 110 is placed in the cover 105, the device wireless antenna 115 may send and receive wireless transmissions to and from the cover wireless antenna 120, using one or more suitable wireless telecommunications protocols, such as, for example, WiFi, WiMAX, Bluetooth, ZigBee, RuBee, etc. Outgoing wireless transmissions may be converted by the WAP electronics 130 into data signals suitable for wired transmission, and then transmitted via the cable 155 over the network 150 in accordance with one or more suitable wired telecommunications protocols, such as, for example, Ethernet (IEEE 802.3). Similarly, incoming wired communications received via the cable 155 may be converted by the WAP electronics 130 into suitable wireless communication signals, and then transmitted to the device wireless antenna 115 via the cover wireless antenna 120.

As described above, when the portable electronic device 110 is placed in the cover 105, the device wireless antenna 115 is preferably located near the cover wireless antenna 120, and the two antennae are substantially surrounded by the shield 125, which acts as a Faraday cage or shield. As a result of this configuration, wireless transmissions between the device wireless antenna 115 and the cover wireless antenna 120 are substantially confined to the portable electronic device 110 and the cover 105, and are not susceptible to interference with or interception by other wireless transmitters or receivers that may be located in the same area. Such a configuration may be particularly advantageous when it is necessary or desirable to send and receive communications with heightened security, privacy, or confidentiality, to or from a portable electronic device 110 which has a wireless antenna 115 but lacks a wired network adaptor.

Figure 2A:
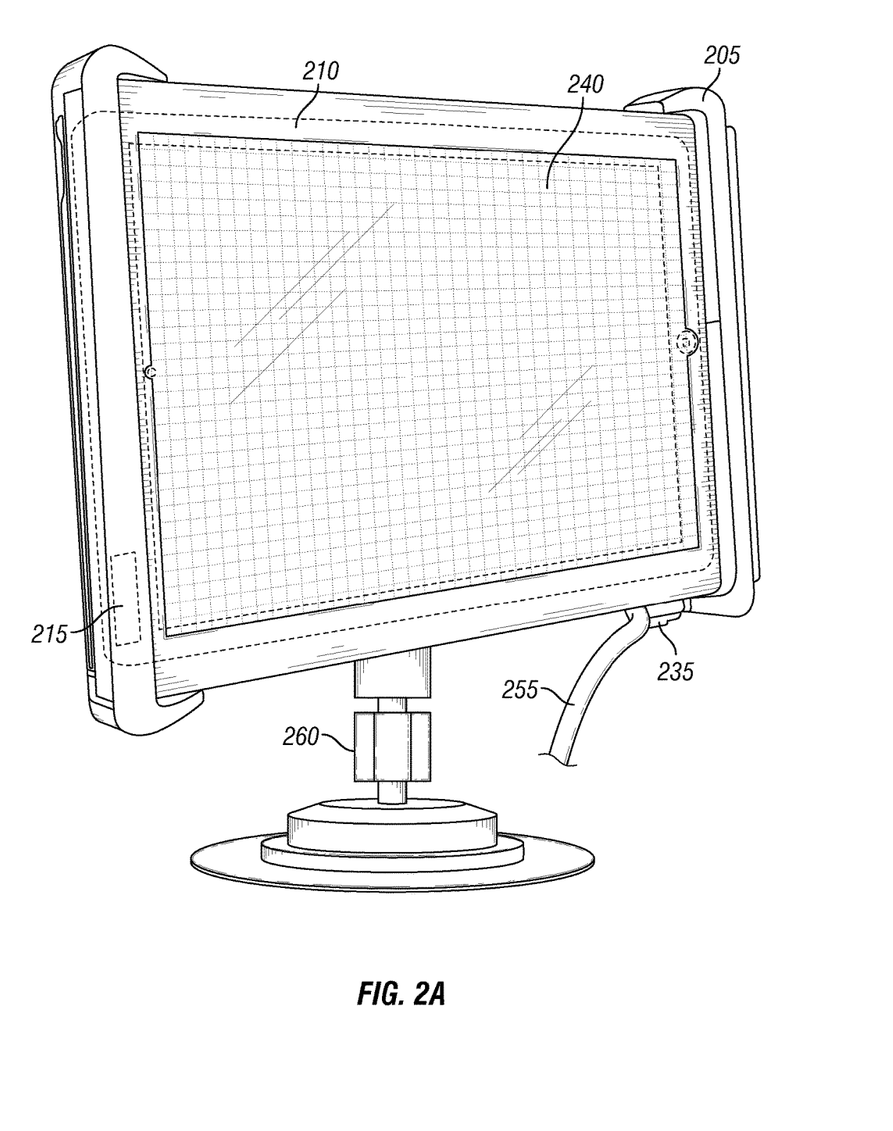
FIGS. 2A and 2B illustrate perspective views of one example of a portable electronic device cover having a wired Ethernet adaptor.
Figure 2B:
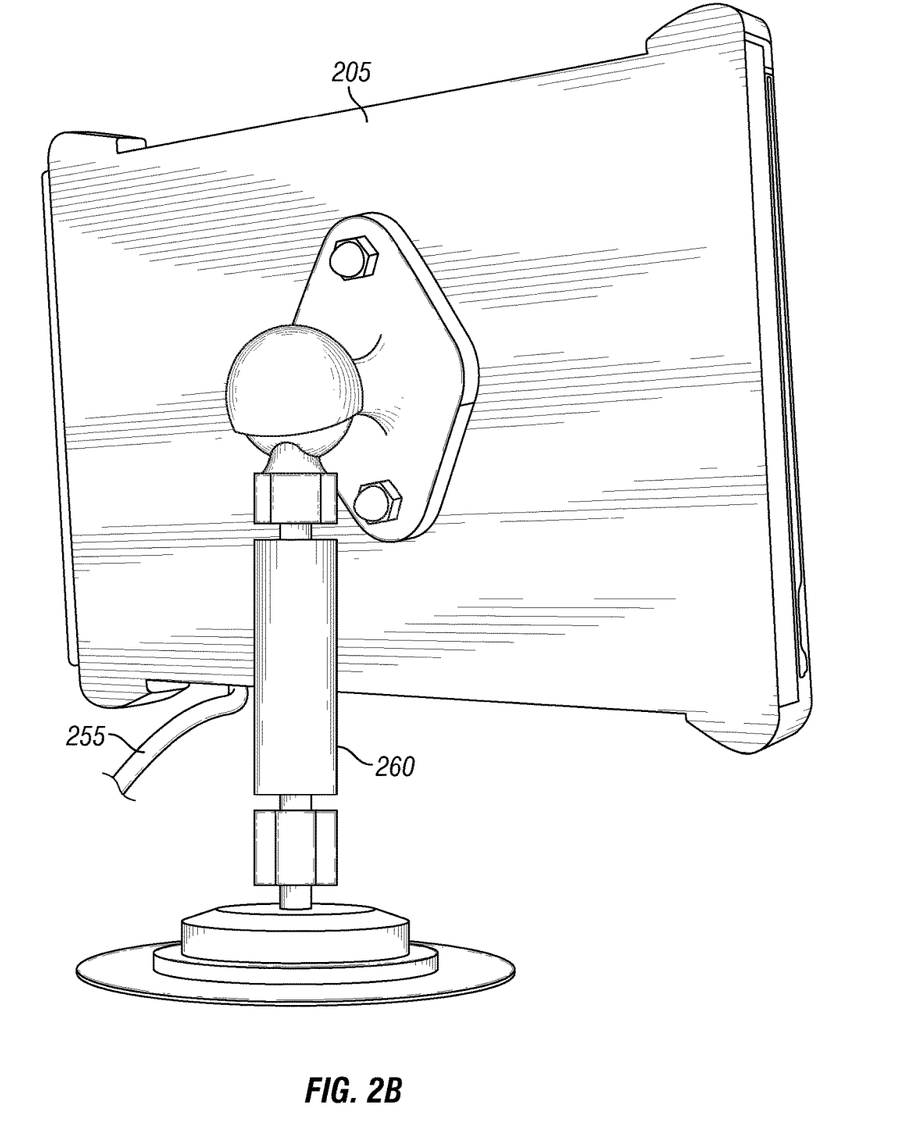

FIGS. 2A and 2B illustrate front and rear perspective views, respectively, of one example of a portable electronic device cover 205 having a wired Ethernet adaptor 235. In the example shown in FIGS. 2A and 2B, the cover 205 comprises a housing configured to accommodate a portable electronic device 210, such as a tablet computer, which has a device wireless antenna 215. Although not shown in FIGS. 2A and 2B, the cover 205 also includes a cover wireless antenna embedded within the housing, together with a shield, such as a metallic foil or mesh, which surrounds the cover wireless antenna and the device wireless antenna 215, when the device 210 is encased within the cover 205. In operation, the cover 205 sends and receives wireless transmissions to and from the portable electronic device 210, which are converted to and from wired telecommunications signals sent to and from the cover 205 via an Ethernet cable 255, as described above.

In addition, in the example shown in FIGS. 2A and 2B, the cover 205 includes an optional screen cover 240 with an embedded wire mesh, which acts as a Faraday shield to substantially block any stray emissions or electromagnetic effects that may otherwise emanate from the portable electronic device 210. The cover 205 also includes an optional cover mount 260, which enables the cover 205 to support the portable electronic device 210 in an upright position. In the particular example shown, the cover mount 260 takes the form of a portable stand with a circular base, which is connected to the back of the cover 205 with a ball and socket fastener. Of course, the optional cover mount 260 (if included) could include a wide variety of additional or alternative components (e.g., brackets, straps, fasteners, etc.) and could take on a wide variety of alternative configurations and form factors, depending on the desired mode of use and operating environment for the portable electronic device 210. For example, in some cases, the cover mount 260 could be configured to affix the cover 205 permanently to a structure (e.g., a wall, kiosk, cabinet, etc.) in a building (e.g., a bank, hospital, military or law enforcement facility, etc.) or a vehicle (e.g., an aircraft, land vehicle, watercraft, etc.).

Figure 3A:
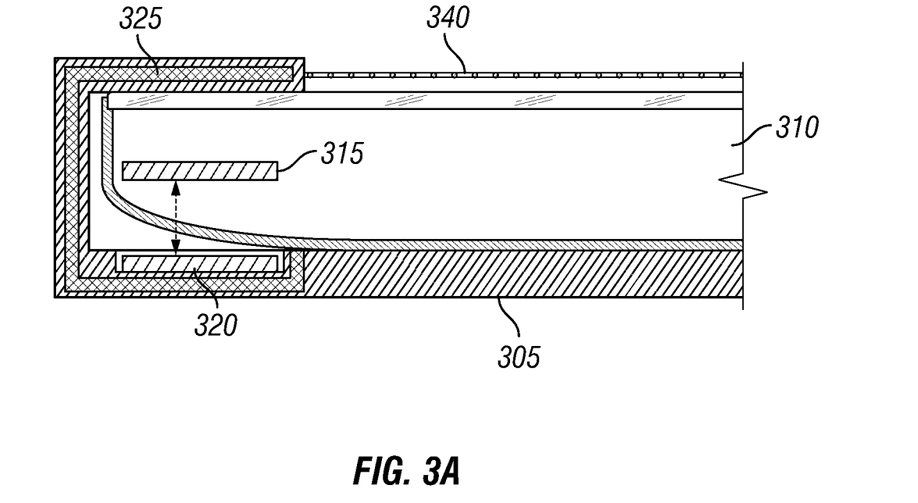
FIGS. 3A and 3B illustrate partial cross-sectional views of two examples of a portable electronic device cover having a wired Ethernet connector.
Figure 3B:
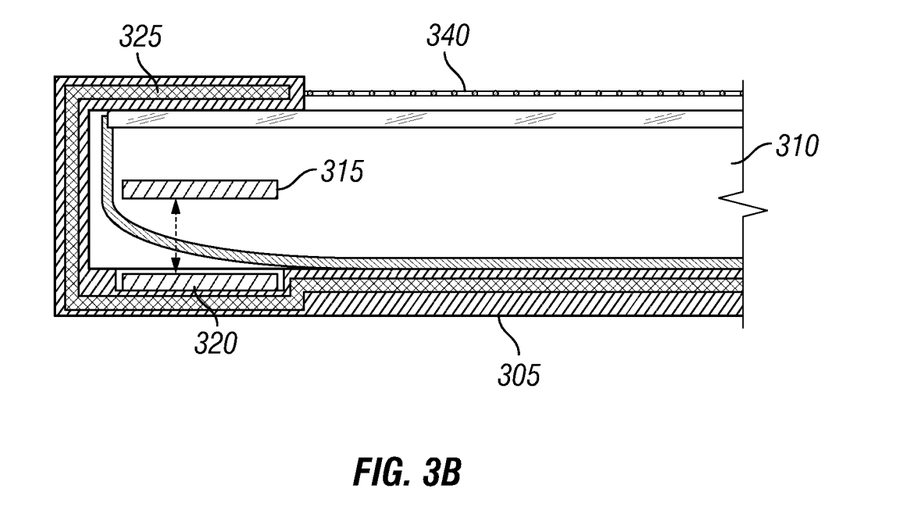

FIGS. 3A and 3B illustrate partial cross-sectional views of two examples of a cover 305 containing a portable electronic device 310 with a cover wireless antenna 315. In the example shown in FIG. 3A, the cover 305 comprises a cover wireless antenna 320, surrounded by shield 325, which is also configured to surround the device wireless antenna 315, when the portable electronic device 310 is encased within the cover 305. In the example shown in FIG. 3B, the shield 325 also includes an additional, optional portion that surrounds the remainder of the portable electronic device 310 when it is encased within the cover 305. In both examples, the cover 305 includes an optional screen cover 340 with an embedded wire mesh, as described above.

Figure 4:
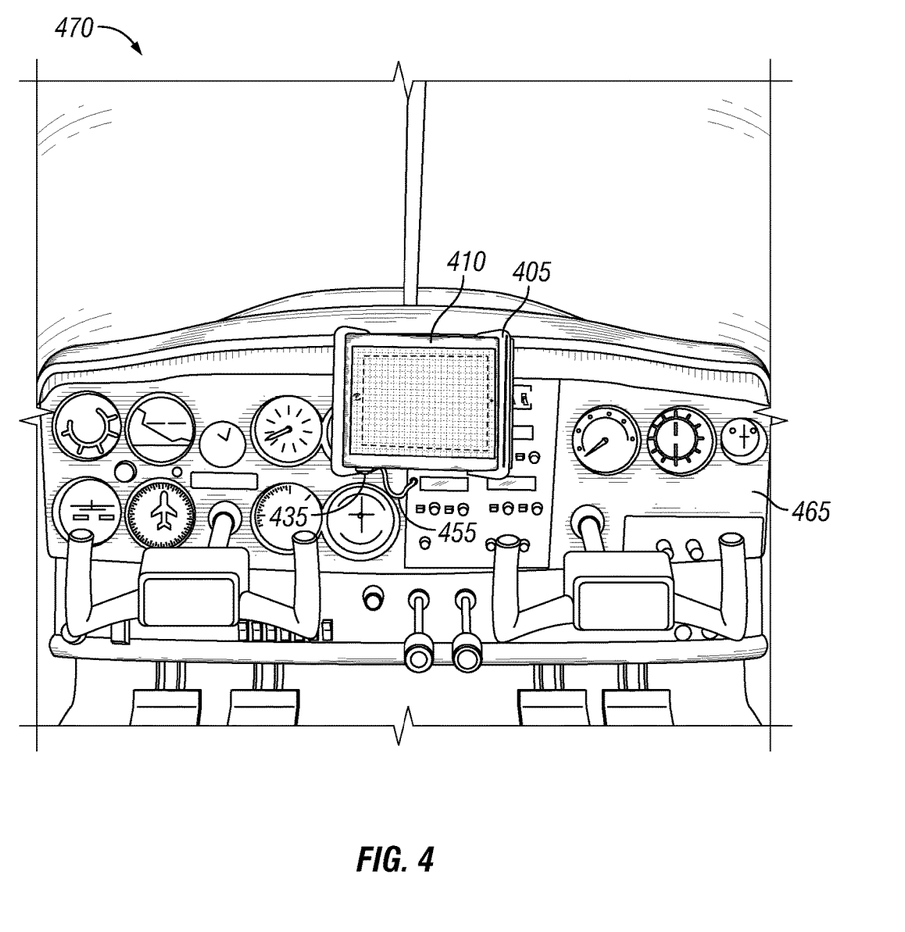
FIG. 4 illustrates one example of portable electronic device cover with a wired Ethernet connector mounted in a vehicle.

FIG. 4 illustrates one example of a cover 405 for a portable electronic device 410, in which the cover 405 has a wired Ethernet connector 435 and is mounted in a vehicle 470. In the example shown in FIG. 4, the vehicle 470 comprises an aircraft, and the cover 405 is mounted to an instrument panel 465 in the cockpit. Of course, one or more covers 405 could be mounted in a variety of other locations in the vehicle 470, such as a passenger cabin, crew area, etc., or in a wide variety of other suitable vehicles or environments. In operation, the cover 405 advantageously enables the portable electronic device 410 to transmit and receive electronic communications via an Ethernet cable 455, as described above.

Although this disclosure has been described in terms of certain preferred configurations, other configurations that are apparent to those of ordinary skill in the art, including configurations that do not provide all of the features and advantages set forth herein, are also within the scope of this disclosure. Accordingly, the scope of the present disclosure is defined only by reference to the appended claims and equivalents thereof.

What is claimed is:

1. A cover for a portable electronic device with a device wireless antenna, the cover comprising:
   a housing configured to accommodate the portable electronic device;
   a cover wireless antenna located within the housing;
   a shield surrounding the cover wireless antenna, and configured to surround the device wireless antenna when the portable electronic device is placed in the cover;
   wireless access point (WAP) electronics in communication with the cover wireless antenna; and
   a wired Ethernet connector in communication with the WAP electronics.

2. The cover of claim 1, further comprising a power source coupled to the cover wireless antenna and the WAP electronics.

3. The cover of claim 1, further comprising a screen cover comprising a substantially transparent or translucent material with an embedded wire mesh.

4. The cover of claim 1, wherein the shield further comprises an additional portion configured such that, when the portable electronic device is placed in the cover, the shield surrounds the portion of the portable electronic device located in the cover.

5. The cover of claim 1, wherein the shield comprises a metallic foil or mesh.

6. The cover of claim 5, wherein the metallic foil or mesh comprises copper or aluminum.

7. The cover of claim 1, wherein the WAP electronics are configured to attenuate the output signal to the cover wireless antenna to a level of about −50 dBm.

8. The cover of claim 1, wherein the cover wireless antenna is configured to be located within about ⅛ inch of the device wireless antenna, when the portable electronic device is placed in the cover.

9. The cover of claim 1, wherein the wired Ethernet connector comprises an 8P8C jack, RF connector, or optical fiber connector.

10. The cover of claim 1, wherein the cover wireless antenna is configured to transmit and receive signals in accordance with one or more of the following wireless telecommunications protocols: IEEE 802.11, IEEE 802.16, IEEE 802.15.1, IEE 802.15.4, or IEEE 1902.1.

11. The cover of claim 1, further comprising a cover mount coupled to the housing.

12. The cover of claim 11, wherein the cover mount is configured to mount the cover to a structure in an aircraft.

13. A system comprising:
   a portable electronic device with a device wireless antenna; and
   a cover with a housing containing the portable electronic device, the cover comprising:
      a cover wireless antenna located within the housing, near the device wireless antenna;
      a shield surrounding the cover wireless antenna and the device wireless antenna;
      wireless access point (WAP) electronics in communication with the cover wireless antenna; and
      a wired Ethernet connector in communication with the WAP electronics and configured to transmit and receive telecommunications signals sent between the cover and a telecommunications network.

14. The system of claim 13, wherein the portable electronic device comprises a tablet computer, media player, or mobile phone.

15. The system of claim 13, further comprising an Ethernet cable coupled to the wired Ethernet connector and configured to carry the telecommunications signals sent between the cover and the telecommunications network.

16. The system of claim 15, wherein the Ethernet cable comprises a twisted pair cable, coaxial cable, or optical fiber.

17. The system of claim 13, wherein the telecommunications network comprises a local area network or a wide area network.

18. A method for communicating with a portable electronic device having a device wireless antenna and located in a cover housing, the method comprising:
- receiving a first wireless transmission from a device wireless antenna of a portable electronic device placed within a cover housing with a cover wireless antenna located within the cover housing, wherein the cover wireless antenna is in communication with a wireless access point (WAP) electronics;
- converting the first wireless transmission to a first wired telecommunications signal; and
- transmitting the first wired telecommunications signal to a telecommunications network via an Ethernet cable coupled to a wired Ethernet connector located within the cover housing.

19. The method of claim 18, further comprising:
- receiving a second wired telecommunications signal via the Ethernet cable;
- converting the second wired telecommunications signal to a second wireless transmission; and
- transmitting the second wireless transmission from the cover wireless antenna to the device wireless antenna.

20. The method of claim 18, wherein the first wireless transmission is transmitted in accordance with one of the following wireless telecommunications protocols: IEEE 802.11, IEEE 802.16, IEEE 802.15.1, IEE 802.15.4, or IEEE 1902.1.

21. The method of claim 18, wherein the device wireless antenna is located within about ⅛ inch of the cover wireless antenna.

* * * * *